United States Patent [19]

Hart et al.

[11] Patent Number: 4,807,232
[45] Date of Patent: Feb. 21, 1989

[54] PHASE LOCKED STAGGERED DIELECTRIC RIDGE ARRAY WAVEGUIDE GAS LASER

[75] Inventors: Richard A. Hart, Wethersfield; Leon A. Newman, South Windsor; John T. Kennedy, Meriden, all of Conn.

[73] Assignee: United Technologies Corporation, Hartford, Conn.

[21] Appl. No.: 138,898

[22] Filed: Dec. 28, 1987

[51] Int. Cl.$^4$ .............................................. H01S 3/098
[52] U.S. Cl. ....................................... 372/18; 372/64; 372/82
[58] Field of Search ........................ 372/18, 55, 64, 82, 372/92

[56] References Cited

U.S. PATENT DOCUMENTS

| | | | |
|---|---|---|---|
| 4,363,126 | 12/1982 | Chenausky et al. | 372/38 |
| 4,443,877 | 4/1984 | Chenausky et al. | 372/38 |
| 4,577,323 | 3/1986 | Newman et al. | 372/82 |
| 4,688,228 | 8/1987 | Newman et al. | 372/18 |

OTHER PUBLICATIONS

L. A. Newman et al; "High Power Coupled $CO_2$ Waveguide Laser Array"; Appl. Phys. Lett. 48(25), Jun. 23, 1986; pp. 1701-1703.
D. G. Youmans, "Phase Locking of Adjacent Channel Leaky Waveguide $CO_2$ Lasers"; Appl. Phys. Lett. 44(4), Feb. 15, 1986, pp. 365-367.
V. V. Antyukhov et al; "Effective Phase Locking of an Array of Lasers"; JETP Lett., vol. 44, No. 2, Jul. 25, 1986; pp. 78-81.

Primary Examiner—William L. Sikes
Assistant Examiner—B. Randolph
Attorney, Agent, or Firm—Peter R. Ruzek

[57] ABSTRACT

A phase-locked staggered ridge array waveguide gas laser includes a body that circumferentially bounds an internal space extending along a central plane and containing a gaseous lasing medium. The gaseous medium is excited at radio frequency with attendant light emission from the gaseous medium. Mirrors are so positioned relative to the body as to provide lasing of the light emission. Two arrays of ridges extending into the internal space along a height dimension partition the internal space into two pluralities of laser resonator cavities each sustaining a guided mode of the lasing light emission. Each of the cavities extends longitudinally of the body and is spaced from an adjacent cavity in a width direction of the internal space. The ridges of each array are offset relative to those of the other array by substantially a half of the spacing between the ridges of each array and are so configured that a cavity of one of the pluralities alignedly opens into a portion of each of two adjacent ones of the cavities of the other plurality. Auxiliary ridge portions that are truncated to delimit respective gaps at the central plane may be provided midway between and coextensively with the ridges of each array.

16 Claims, 5 Drawing Sheets

PHASE LOCKED STAGGERED DIELECTRIC RIDGE ARRAY WAVEGUIDE GAS LASER

The Government has rights in this invention pursuant to a contract awarded by the Department of the Air Force.

DESCRIPTION

1. Technical Field

This invention relates to waveguide lasers and more particularly to $CO_2$ waveguide lasers having a multitude of phase locked resonators separated from each other by arrays of ridges.

2. Background Art

The advent of the waveguide gas laser allows the fabrication of more compact lasers. Reducing the dimensions of the passage of the discharge housing provides increased gain, higher power generated per unit volume and improved saturation parameter. This increase in power is achieved even though linear gas waveguides leak radiation into the walls of the dielectric, because of the existence of well defined, low loss modes of laser propagation. The performance enhancements result from favorable de-excitation of the gas by wall collisions, from device operation at increased gas pressure, and from reduction in gas temperature due to the improved thermal conduction provided by the waveguide walls.

In an effort to further increase output power, several improvements have been developed. One device presented by H. R. Schlossberg in U.S. Pat. No. 4,367,554 of Jan. 4, 1983 has increased output power by employing a plurality of hollow dielectric channels within a chamber containing a $CO_2$ gas mixture. The diameter of the individual dielectric channels must be selected such that each channel is incapable of sustaining a guided mode of propagation, and be fabricated with an optically leaky dielectric. Only the multiplicity of leaky channels in combination provides sufficient gain for lasing within a device that comprises the totality of channels.

Another technique which has been used to increase the output power of gas lasers is to provide a mechanism for phase locking one laser relative to another, either by injection locking or by optical coupling techniques. Phase locking maintains spatial coherence between the individual resonators.

Injection locking of adjacent lasers is accomplished by feeding the output of a single laser into a parallel array of optical resonators which act as amplifiers. When the lengths of the different optical paths are adjusted properly, the phase of the output of the amplifiers is constant. Although this technique provides phase locking and increased power, it mandates the use of external optical assemblies, such as mirrors and mounts, all of which must be precisely adjusted and which are subject to environmental degradation.

Another effective technique for providing phase locking is by optically coupling adjacent lasers. Phase locked operation of adjacent lasers by optical coupling has been demonstrated in both waveguide gas lasers and semiconductor lasers. However, the physics which determine the operation of semiconductor lasers differ substantially from those applicable to waveguide gas lasers. A semiconductor laser is characterized by a guiding region whose index of refraction is greater than that of the surrounding cladding material. On the other hand, a waveguide gas laser possesses a guiding region having an index of refraction much lower than that of the surrounding material.

Optical coupling in the two types of lasers occurs from two entirely different mechanisms. Semiconductor lasers couple as a result of the existence of an evanescent portion of the guided optical field in one resonator that penetrates into another closely proximate resonator. Optical coupling between adjacent waveguide gas lasers cannot be by evanescent field coupling, but can only result from optical radiation loss or "leaks" between adjacent lasers. Consequently, techniques used to optically couple semiconductor lasers have only limited, if any, applicability to waveguide gas lasers.

One type of an optically coupled waveguide gas laser of the prior art comprises an elongated chamber that is divided into a plurality of longitudinal waveguides by partitions made from an optically transmitting dielectric material. Prior art lasers of this type are excited by conventional DC or RF discharge that is provided to each optical resonator. The optically transmissive dielectric provides a lossy boundary through which energy leaks from one resonating cavity to the next, effectively coupling the phases and changing the amplitude distribution of the waveguide modes.

Coupled waveguide gas lasers of this kind provide for increased power and phase locking. However, these devices are expensive to fabricate because of the dielectric array contained within the chamber. In addition, the amount of energy which "leaks" from one cavity to the next is limited to relatively small levels because of the high reflectivity of the transmitting material at the oblique angles of incidence which characterize mode propagation in waveguides. This in turn limits the operating parameters under which stable phase locked operation can be achieved.

Optically transmitting dielectric materials absorb power to some extent and reduce the overall amount of power available to the laser. It is well known in the art that employing a lossy dielectric separation between resonators will favor the "antisymmetric" phase locked normal mode of operation. This mode of operation is undesirable for most applications because the laser output beam possesses a power null across the optic axis. Moreover, the compartmentalized design of these lasers burdens them with poor thermal conductivity and undesirable gas flow characteristics. It is difficult to obtain optically transmitting materials in the infrared that are also good heat conductors for carrying away the heat generated by the electrical power dissipated in the laser's plasma column.

Initiating and sustaining a discharge in the resonator regions is difficult. With either DC or RF excitation, the resonator ridge geometry produces a higher electric field strength within the gap above the ridges than in the resonators. Consequently, coupled ridge waveguide gas lasers of the prior art prevent gas breakdown in the gap and limit the discharge to the resonator regions. The additional apparatus needed to confine the discharge entails using additional components resulting in higher costs.

In quest for increasing the output power of a waveguide gas laser arrangement, it has been proposed in a copending commonly assigned U.S. Pat. No. 4,688,228, issued Aug. 18, 1987, to arrange a plurality of resonator cavities next to one another, and to separate each adjacent two of such cavities from each other only incompletely by a ridge which extends from one of the major internal surfaces bounding the cross-sectionally rectangular internal space of the laser body toward the other major surface, but which terminates short of such other major surface.

Experience has shown that this waveguide gas laser arrangement operated well with two of such resonator cavities. However, when the number of the resonator cavities that are arranged next to one another was increased to three or more with all of the ridges still extending from one and the same major surface, problems were encountered with the quality of the combined laser beam emerging from the laser arrangement and particularly with phase locking between and among the resonator cavities. Such problems are attributable to the fact that a large open or unguided region exists at one of the major surfaces bounding the internal space subdivided by the ridges into individual resonator cavities. This open region not only permits radiation to leak from one of the resonator cavities to the adjacent one to achieve the desirable phase locking, but also permits the undesirable development of higher-order transverse modes. Consequently, a great number of transverse mode beats was observed in laser arrangements having several adjacent resonator cavities connected with one another by such a large open region.

Moreover, the gain and mode volumes of the previously proposed gas laser arrangements provided with cross-sectionally rectangular or U-shaped channels forming the resonator cavities are not well matched to one another. Such U-shaped channels included corners where the gaseous lasing medium was being pumped and, consequently, exhibited gain. This had two disadvantageous results. First, the power dissipated in the corners of such cross-sectionally rectangular or U-shaped channels was wasted, resulting in a diminished efficiency of the gas laser arrangement. Secondly, gain within the corner regions was able to support modes other than the $EH_{11}$ mode desired in laser arrangements of this type, resulting in mode beating in the outgoing laser beam and in further reduction in the useful power of such output laser beam.

Accordingly, it is a general object of the present invention to avoid the disadvantages of the prior art.

More particularly, it is an object of the present invention to provide a waveguide gas laser arrangement which does not possess the disadvantages of the known arrangements of this type.

Still another object of the present invention is so to construct the arrangement of the type here under consideration as to provide strong phase coupling between and among the modes generated in the resonator cavities.

A concomitant object of the present invention is to develop the above arrangement in such a manner as to avoid transverse modes of any order higher than that desired.

It is yet another object of the present invention to design the above arrangement as to be relatively simple in construction, inexpensive to manufacture, easy to use, and yet reliable in operation.

DISCLOSURE OF THE INVENTION

The above objects and others which will become apparent hereafter are achieved by a phase-locked ridge waveguide gas laser which includes a body circumferentially bounding an internal space extending along a central plane and containing a gaseous lasing medium. The gaseous medium is excited at radio frequency with attendant light emission from the gaseous medium. Mirrors are so positioned relative to the body as to provide lasing of the light emission. At least two arrays of ridges partition the internal space into at least two pluralities of laser resonator cavities each having a predetermined width for sustaining a guided mode of the lasing light emission. Each of the cavities extends longitudinally of the body and is spaced from an adjacent cavity of the same plurality in a width direction of the internal space. The ridges extend into the internal space along a height dimension to respectively delimit the cavities of one and the other of the pluralities.

The ridges of one of the arrays extend in an opposite longitudinal direction from a transverse plane that is parallel to the height and width dimensions than those of the other array, are offset relative to those of the other array in the direction of the width dimension by substantially one-half of the predetermined width, and have such a cross-sectional configuration that a cavity of one of the pluralities alignedly opens into a portion of each of two adjacent ones of the cavities of the respective other plurality.

The cross-sectional configuration of each of the ridges may advantageously be substantially rectangular. It is particularly advantageous when each of the ridges consists of two ridge portions each of which projects toward the central plane from a different one of two major surfaces of the body that are parallel to the central plane and delimit the internal space. In this case, the cross-sectional configuration of each of the ridge portions may be either substantially rectangular or, in an especially advantageous implementation of the present invention, substantially cusp-shaped. In each instance, it may be advantageous for each of the ridge portions to extend at least substantially all the way to the central plane. Each of the cusp-shaped ridge portions is advantageously delimited by two concave surfaces.

According to another advantageous facet of the present invention, the gas laser further comprises auxiliary ridge portions projecting from at least one of the major surfaces each substantially midway between and coextensively with two adjacent ones of the ridge portions of at least one of the arrays to separate two portions of the respective cavity from one another. Then, each of the auxiliary ridge portions constitutes an aligned continuation of a corresponding ridge portion of the other of the arrays and terminates a predetermined distance short of the central plane to delimit a gap through which the portions of the respective cavity are in communication with one another at least at the central plane. Advantageously, there are further provided additional ones of the auxiliary ridge portions similar to the auxiliary ridge portions and projecting from the other of the major surfaces in alignment with the auxiliary ridge portions. The auxiliary and additional auxiliary ridge portions thus collectively constitute an array of auxiliary ridge portions interleaved with the ridge portions of one of the arrays. Then, there may advantageously be provided another array of auxiliary ridge portions similar to the aforementioned array of auxiliary ridge portions and interleaved with the ridge portions of the other of the arrays. In this context, it is advantageous when the cross-sectional configuration of each of the ridge portions is substantially cusp-shaped and when each of the auxiliary ridge portions has a cross-sectional configuration of a truncated cusp.

According to another advantageous concept of the present invention, each of the arrays includes two sets of the ridges, the ridges of each set projecting from a different one of the major surfaces of the body toward the central plane. The ridges of one of the sets of each of the arrays are then advantageously situated substantially midway between the ridges of the other set of the same array. Under these circumstances, it is especially advantageous when there are further provided auxiliary ridges each coextensive with two adjacent ones of the ridges of one of the sets and aligned in the direction of the height dimension with an associated ridge of the other set of the respective array and constituting an aligned continuation of a corresponding ridge of the other array. Then, each of the auxiliary ridges terminates a predetermined distance short of the central plane to delimit a gap through which portions of the respective cavity that are separated from one another by the respective auxiliary ridge are in communication with one another at the central plane. Even here, it is advantageous when the cross-sectional configuration of each of the ridges is substantially cusp-shaped and the cross-sectional configuration of each auxiliary ridge is that of a truncated cusp.

A particular advantage of the present invention is that, inasmuch as the ridges or ridge portions of one of the arrays are staggered, that is transversely offset by one-half of the cavity width, relative to those of the other array, they are situated at respective regions at which the lowest-order mode of the laser light that could develop in the respective cavity has a high energy level and thus they pronouncedly attenuate this mode as the laser light crosses the transverse plane separating the two ridge arrays, while being located outside the propagation path of the next higher-order mode of the laser light and thus not attenuating this mode. This, in effect, means that only lasing in such higher-order mode will be sustained. Moreover, there is obtained excellent phase locking between and among the laser beams propagating in the various cavities and eventually issuing therefrom, inasmuch as the aforementioned next higher-order mode laser beam of each cavity of one plurality, which has two antisymmetric lobes, is split at the transverse plane into such lobes and each of these lobes then combines in the respective cavity of the other plurality with a corresponding adjacent lobe of the laser beam crossing the transverse plane from the adjacent cavity of the one plurality. These adjacent lobes will combine into a mode that will not be attenuated during the next following crossing of the transverse plane into the respective cavities of the one plurality only if such lobes are phase-locked and antisymmetric relative to one another. Consequently, the gas laser arrangement constructed in accordance with the present invention forms an intracavity mode discriminator which is lowest in loss for the antisymmetric mode, and therefore operates in only this mode.

BEST MODE FOR CARRYING OUT THE INVENTION

Figure 1:
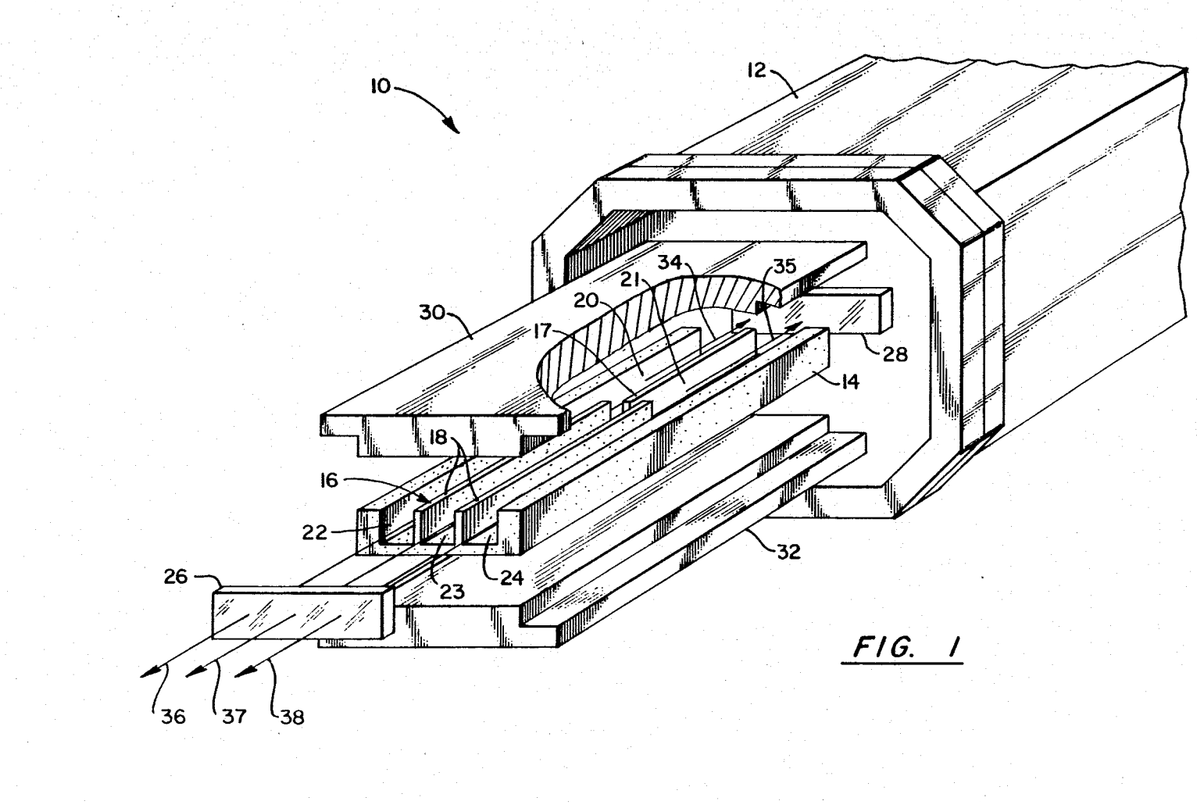
FIG. 1 is an exploded perspective illustration of a phase locked staggered rectangular ridge array waveguide gas laser provided according to the present invention.

Referring now to FIG. 1, which is an exploded perspective illustration of a phase locked staggered rectangular ridge array waveguide gas laser provided according to the present invention, it may be seen that a phase locked staggered ridge array waveguide gas laser 10 comprises a housing 12 made from bakable aluminum or equivalent. The housing 12 contains a dielectric body 14 which is made from a ceramic material or equivalent. The dielectric body 14 bounds an internal space 16. The housing 12 also includes end covers and a gas port in the housing (not shown) enabling the device to be evacuated and back filled with a lasing gas that is also not illustrated.

Inside the internal space 16 are longitudinal ridges 17 and 18 formed on the body 14 by conventional techniques. These ridges 17 and 18 are shown to respectively define five optical resonators 20, 21, 22, 23, and 24, as an example. Each of the ridges 17 and 18 extends substantially over one-half of the length of longitudinal dimension of the body 14 in such a manner that the ridge 17 is situated at an opposite longitudinal side of a transverse plane that extends along the width and height dimensions of the body 14 than the ridges 18. Moreover, the ridge 17, on the one hand, and the ridges 18, on the other hand, are staggered relative to one another, that is, the ridge 17 is situated substantially midway between the ridges 18 as considered in the direction of the width dimension of the body 14. This means that, for instance, the resonator 23 alignedly opens at the aforementioned transverse plane into a portion of the resonator 20 that is located next to the ridge 17, and also into a corresponding portion of the resonator 21. The same is also applicable, in a corresponding manner, to the remaining ones of the resonators 20 to 24. While only one ridge 17 and two of the ridges 18 have been depicted in FIG. 1 for the purpose of illustrating the basic principles of the present invention in a manner lending itself to simple illustration, it is to be mentioned that an array containing several of the ridges 17, and another array containing a number of the ridges 18 that is greater by one than that of the ridges 17, will be provided in practical implementations of the present invention.

As will be hereinafter detailed with respect to FIG. 2, the dimensions of the resonators 20 to 24 must be selected to sustain lasing in a selected mode and to provide optical coupling between the resonators 20, 21, 22, 23, and 24. In the best mode embodiment, the length of the resonators 20 to 24 is approximately 37 cm, although other lengths may be substituted. The dielectric material selected to comprise the body 14 can be a ceramic material of a type known in the art, such as aluminum oxide ($Al_2O_3$) and in the best mode embodiment comprises beryllium oxide (BeO). Those skilled in the art will note that the ridges 17 and 18 may comprise a different dielectric than the remainders of the ceramic body 14 and may equivalently be fabricated separately from the body 14 and subsequently positioned in the internal space 16 during assembly.

Mirrors 26 and 28 are located by conventional techniques at either end of the body 14 or within the end covers perpendicular to the resonators 20 to 24. They are made from conventional materials known in the art, such as zinc selenide, and are chosen to be reflective of a selected percentage of incident light at a selected wavelength.

The lasing gas is a conventional mixture, and in the best mode embodiment comprises a mixture of 4% xenon, 12% carbon dioxide, 20% nitrogen and 64% helium by mole fraction at a pressure of 100 Torr. Those skilled in the art will note that other equivalent mixtures and pressures may be equivalently substituted.

Also included are radio frequency electrodes 30 and 32 which are of a conventional type and extend over the entire length of the resonators 20 to 24. In the best mode embodiment the electrodes 30 and 32 comprise copper or aluminum sheet at least 20 $\mu$m thick for excitation at 145 MHz. If other excitation frequencies are substituted, the thickness of the electrodes 30 and 32 must be chosen to be greater than the skin depth. The electrodes 30 and 32 are attached by conventional techniques to the body 14.

When assembled, the housing 12 is evacuated and then filled with the lasing gas. Radio frequency excitation is provided to the RF electrodes 30 and 32 via a conventional RF feedthrough in the housing 12 (not shown) and produces an electrical excitation of the gas. As is well known in the art, proper selection of the optical parameters and gas pressures will result in lasing of the device. Guided mode optical signals 34, 35, 36, 37, and 38 will be produced in the respective resonators 20, 21, 22, 23, and 24.

Although conventional radio frequency excitation may be employed, in the best mode embodiment the radio frequency excitation circuit comprises a distributed inductance parallel resonant radio frequency circuit as presented by Peter Chenausky et al in U.S. Pat. Nos. 4,363,126 and 4,443,877 assigned to the assignee hereof and incorporated by reference herein.

The RF field is developed in the capacitor formed by the body 14 and the upper and lower RF electrodes 30 and 32. The circuit initiates and sustains an electric excitation in the resonator region of the housing 12. An external shunt inductance is provided to resonate the capacitance of the excitation structure. Conventional 50 ohm impedance RF power supplies can effectively be matched to the transverse excitation impedance load presented by the laser structure. By operating a few megahertz off of the center resonant frequency, a point is reached where the real impedance equals 50 ohms. This is achieved by cancelling the reactive component of the discharge impedance at this frequency with a series reactance that is capacitative for low frequencies and inductive at high frequencies.

A problem develops as the length of the device is scaled and/or the frequency of the RF field is increased. A voltage variation develops along the length of the device because the electrical characteristics of the laser are distributed throughout its length resulting in a nonuniform discharge and reduced output per unit length. For example, at an operating frequency of 145 MHz and a device length of 37 cm, the high dielectric constant parallel electrode geometry will exhibit standing wave phenomena similar to those observed in a lossy transmission line. Analysis has revealed that if a distributed inductance comprising a multiplicity of discrete circuit inductors is used to resonate the laser, the voltage variations are essentially eliminated. In the best mode embodiment the inductors comprise discrete circuit elements (not shown in FIG. 1) connected between the two RF electrodes 30 and 32. The spacing between the inductors should be much less than a quarter of the excitation wavelength to adequately approximate the distributed inductance. In the best mode embodiment the distributed parallel inductance has a magnitude of 10 nanohenrys and is comprised of at least ten coils on each side of the body 14.

The use of a parallel resonant radio frequency circuit as presented by the aforementioned Peter Chenausky et al patents and detailed hereinabove allow the construction of long phase locked ridge waveguide gas lasers operating at high frequencies which can be driven with a very simple single port RF connector.

Figure 2:
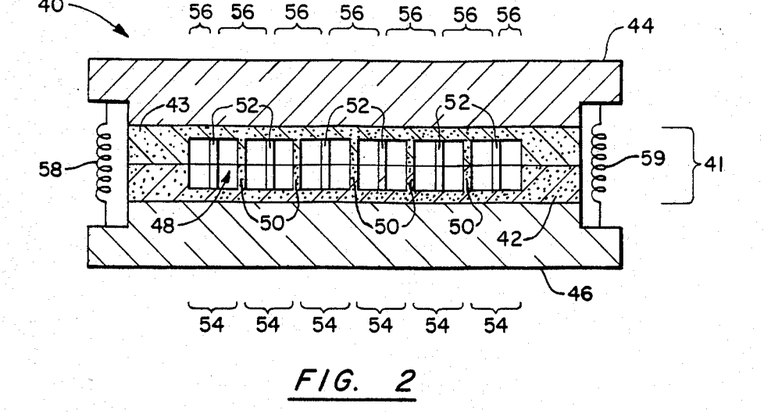
FIG. 2 is a sectioned illustration of a portion of a phase locked staggered rectangular ridge array waveguide gas laser which has been slightly modified relative to that of FIG. 1.

FIG. 2 is a sectioned illustration of a portion 40 of the phase locked ridge waveguide gas laser of FIG. 1. Dielectric body 41, which consists of components 42 and 43, is bounded by upper RF electrode 44 and lower RF electrode 46. Within internal space 48 are arrays of ridges 50 and 52 which form respective resonators 54 and 56. Each of the ridges 50 and 52 consists of two ridge portions each of which extends into the internal space 48 from a different one of the components 42 and 43. Each two ridge portions of the ridges 50 and 52 which are aligned with one another in the vertical direction as considered in FIG. 2 constitute a respective pair. The internal space 48 and the ridges 50 and 52 formed in the body 41 are fabricated by techniques well known in the art. Also illustrated are discrete inductor coils 58 and 59 located between the upper and lower RF electrodes 44 and 46 on either side of the body 41. The inductors 58 and 59 comprise part of the distributed inductance parallel resonant circuit described hereinabove with respect to FIG. 1.

Although five of the ridges 50 delimiting six of the resonators 54 and six of the ridges 52 delimiting seven of the resonators 56 are shown in FIG. 2, those skilled in the art will note that a greater or lesser number of ridges delineating a greater or lesser number of resonators may be selected. The portions of such ridges 52 and 54 will then extend into the internal space 48 in respective pairs from the components 42 and 43. Moreover, although only a linear array of parallel resonators 54 and 56 is illustrated, those skilled in the art will recognize that other geometrical resonator configurations such as cylindrical or opposed linear array of parallel resonators may be similarly chosen.

The height of the portions of the ridges 50 and 52 is selected to be about a half of the height of the internal space 48 and in any event in such a manner that there is total physical separation between each adjacent two of the resonators 54, on the one hand, and each adjacent two of the resonators 56, on the other hand, after the assembly of the components 42 and 43 to form the body 41. However, because of the staggered arrangement of the ridges 50 and 52, each of the resonators 54 opens into portions of two adjacent ones of the resonators 56 and vice versa except for the two laterally outer resonators 56 each of which is shown to have a width amounting to only about a half of that of the other resonators 54 and 56 and to open into a portion of only one of the resonators 54.

When RF voltage is applied to the resonators 54 and 56 by the electrodes 44 and 46, the natural tendency would be for the preferential or exclusive development of the lowest possible mode order of the laser light, that is the $EH_{11}$ mode, in each of the resonators 54 and 56. However, since the ridges 50 and 52 are transversely offset or staggered relative to one another by about one-half of the resonator width, the respective ridge 52 is situated in the middle of the path of injection of the laser beam excited in the respective resonator 54 into the corresponding adjacent portions of the associated resonators 56. Similarly, the respective ridge 50 is situated in the middle of the path of injection of the laser beam excited in the respective resonator 56 into the corresponding adjacent portions of the associated resonators 54. This means that the $EH_{11}$ mode will be heavily attenuated because its high-intensity region will meet with the respective ridge 50 or 52 on crossing the aforementioned transverse plane and thus most if not all of the energy propagating in this high-intensity region of the $EH_{11}$ mode will be either absorbed or otherwise dissipated upon encountering the respective ridge 50 or 52. In the final analysis, this also means that the $EH_{11}$ mode will not be able to build up in either one of the resonators 54 and 56 so that, for all intents and purposes, it will not exist in such resonators 54 and 56.

Similar considerations also apply to modes that are either out of phase or symmetric with respect to one another as between the adjacent resonators 54 or 56. This is so because the portions of such modes which enter the respective other resonators 56 or 54 after crossing the aforementioned transverse plane will combine with one another by diffraction or interference in such other resonators 56 or 54 into at least a semblance of the $EH_{11}$ mode which will suffer the same fate during the next pass across the transverse plane back into the original resonators 54 or 56 as the $EH_{11}$ mode originally generated in the other resonators 56 or 54.

It may be seen from the above analysis that the resonator layout that has been described above heavily discriminates against the $EH_{11}$ mode as well as against the out-of-phase and symmetric modes, to the extent that such modes will not be able to develop or build up in the resonators 54 and 56. Therefore, the only viable or sustainable mode of laser light generated in the resonators 54 and 56 which will propagate at low losses is the next higher-order mode, that is the antisymmetric $EH_{21}$ mode. This is diagrammatically indicated in FIG. 3 of the drawing for a portion of a resonator structure resembling that of FIG. 1 but expanded relative thereto by showing an additional ridge 17 and an additional cavity 19, with the lobes of the $EH_{21}$ mode encountered in the resonators 22, 23 and 24 being represented by oval formations 60 and 62 and their antisymmetric polarization being indicated by respective arrows. It may be seen that only marginal and low-intensity regions of such lobes 60 and 62 encounter the respective ridges 17, so that the extent of attenuation of the $EH_{21}$ mode is very small if not negligible. In any event, the $EH_{21}$ mode, with its central on-axis intensity null, is not nearly as affected by the ridges 17 and 18 as the $EH_{11}$ mode would be.

Figure 3:
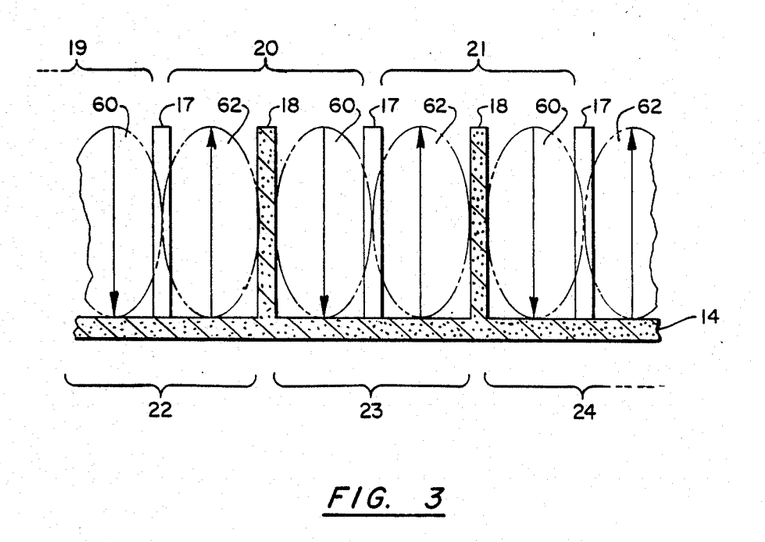
FIG. 3 is a sectioned illustration of a portion of the phase locked staggered ridge array waveguide gas laser of FIG. 1.

Extending this low-loss mode across the entire array width requires the array to be phase-locked. In this context, it is to be mentioned that the two lobes 60 and 62 which enter, for instance, the resonator 20 from the respective aligned portions of the adjacent resonators 22 and 23 will have to be able to recombine in the resonator 20 into an antisymmetric $EH_{21}$ mode, and that this can happen, as explained in some detail before, only if the lobes or portions to be combined are phase locked and 180° apart. Thus, all lasing activity which violates this rule will be suppressed and the arrangement will settle in an operation where the oppositely phased lobes will alternate with one another throughout the resonator structure.

While the antisymmetric mode has a two-lobe far-field intensity profile with a central on-axis null, this profile being less desirable than that of the symmetric mode, several techniques are known that may be used to maximize the on-axis intensity. One of these techniques involves simply introducing a 180° phase shift in the near field for every other lobe of the $EH_{21}$ mode, thereby producing the in-phase symmetric mode far-field pattern. Another approach utilizing binary optics technology may also be used to channel the majority of the side-lobe energy into the central lobe.

Figure 4:
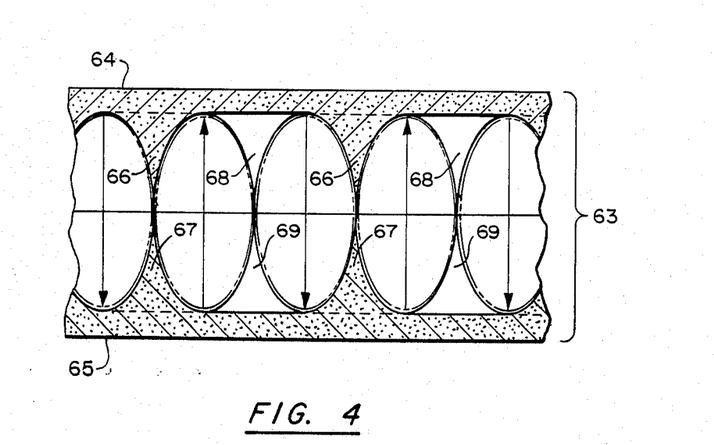
FIG. 4 is a view similar to that of FIG. 3 but showing a modified configuration of the ridges.

An improved matching of the gain and mode volumes is obtained when, as shown in FIG. 4 of the drawing, there is provided a dielectric body 63 consisting of two components 64 and 65 which are provided with respective cusp-shaped ridge portions 66 to 69 instead of the previously disclosed rectangular ones. The ridge portions 66 and 67 extend from the components 64 and 65, respectively, in the plane of the drawing and they meet at a central plane. Similarly, the ridge portions 68 and 69 project from the components 64 and 65, respectively, and meet at the central plane, but they are disposed behind the plane of the drawing. Because of their cusp-shaped configurations, the ridge portions 66 to 69 are located outside the $EH_{21}$ lobe volumes but they still suppress the $EH_{11}$ mode, so that the operation is the same as discussed above, and yet the attenuation of the $EH_{21}$ mode is reduced.

Figure 5:
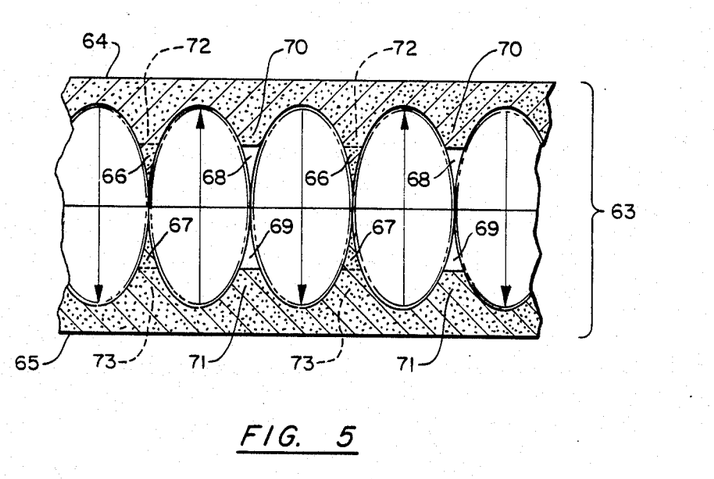
FIG. 5 is a view akin to that of FIG. 4 but showing additional ridge portions.

An even more improved mode and gain volume matching can be accomplished by using the configuration depicted in FIG. 5 of the drawing which is similar to that of FIG. 4 in so many respects that the same reference numerals have been employed to indicate corresponding parts. However, in this configuration, auxiliary ridge portions 70 to 73, which have the shapes of truncated cusps, alternate with the ridge portions 66 to 69 in the width direction of the dielectric body 63. These ridge portions 70 to 73 again interfere with the $EH_{11}$ mode but not with the $EH_{21}$ mode, so that the same advantageous results as mentioned before are obtained here. In an alternative, the auxiliary ridge portions 70 to 73 may be aligned in the vertical direction as considered in the drawing with the ridge portions 66 to 69. In either case, the gaps resulting from the truncation of the ridge portions 70 to 73 provide for the phase locking of the adjacent lobes of the $EH_{21}$ mode, and yet the staggered ridge concept is retained.

Ordinarily, in order to increase the amount of coupling between channels, it would be desirable to fabricate as small a separation as possible and as large a gap as possible. However, a countervailing consideration is that an increase in the gap will increase the likelihood of development of undesirable higher-order transverse modes or the power of such modes. This militates for as small a gap as possible or feasible. Yet, the size of the gap is limited by material and fabrication constraints. However, the size of the gap is not a real issue in the configurations proposed here, inasmuch as adjacent ones of these gaps are not aligned with one another at the same side of the central plane.

For efficient operation of the laser, it is necessary that an RF excitation be created in each of the resonators. When the RF excitation is applied, the field strength between the electrodes is much higher in the gap region than in the resonator region. Those skilled in the art will note that gas breakdown will first occur within the gap region and will most probably be limited thereto. However, in the phase locked staggered ridge array waveguide gas laser provided according to the present invention, the dimensions of the ridges are selected to create a gap region discharge such that free electrons oscillating therein will make sufficient numbers of ionizing collisions with gas atoms within the resonators to initiate and sustain a discharge in the resonators adjacent to the ridges.

As is well known in the art, the resonator geometry of waveguide gas lasers must be selected to enable guided mode propagation of an optical signal within the guide. According to the present invention, the function of the ridges is to provide a sufficiently lossy boundary between resonators to enable guided mode propagation in the resonators, while providing for as much optical coupling by radiation leakage as possible. Therefore, it would be theoretically best to minimize the overall dimensions of the ridges themselves. Moreover, smaller ridge geometries allow for more compact laser designs and provide savings in material costs. Yet, as mentioned before, decreasing the dimensions of the ridges increases the sizes of the gaps therebetween, with attendant possibility of an increase in the likelihood of development of undesirable higher-order transverse modes. To avoid this, it was attempted to keep the size of the gaps to a minimum while still maintaining sufficient phase locking.

All ridge portions must possess a certain minimum width or lose their structural integrity. Ceramic materials such as aluminum oxide or beryllium oxide break away when they are too thin. Thus, even though it would be desirable for the ridge portions 66 to 69 to converge to a sharp edge at the central plane, they usually have to be made somewhat wider to avoid the formation of unacceptably large gaps between their edges at the central plane, so that such edges will usually be blunt. Although conventional fabrication techniques can be used, ridges fabricated in ceramics require complex machinery and have high fabrication costs. Yet, such increased costs may be warranted to reduce the size of the gap between such edges.

A design which provides more compact geometry and ease of fabrication is a U-shaped waveguide as provided by commonly assigned copending application entitled U CHANNEL WAVEGUIDE LASER, U.S. Ser. No. 529,438, now U.S. Pat. No. 4,577,323. A U-shaped resonator design mandates a modified double concave ridge cross-sectional geometry for a phase locked ridge waveguide gas laser. The double concave ridge geometry as applied in FIGS. 4 and 5 is of superior strength as compared with such U-shaped resonator design because thicker walls at the base of the ridge portions 66 to 69 allow for narrower ridges to be fabricated. Also, the modified double concave ridges 66 to 69 are more easily fabricated as they eliminate several machining steps needed to fabricate flat bottomed resonators. Furthermore, and possibly most importantly, the ridge shape proposed by the present invention provides for overlap of the gain regions of the adjacent laser resonator cavities, with attendant phase locking.

Figure 6A:
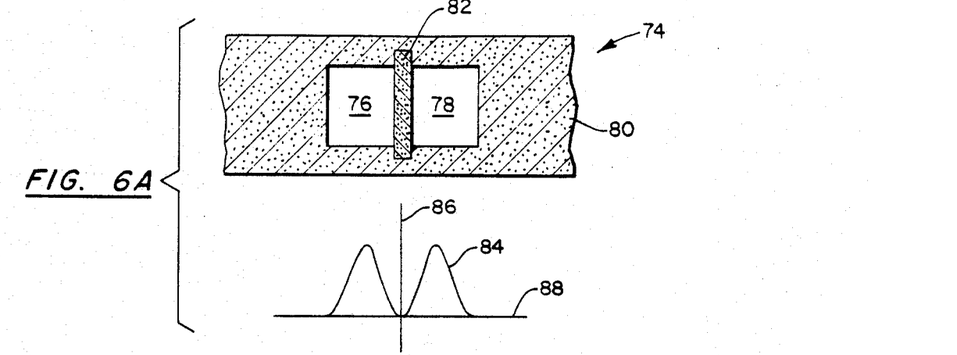
FIG. 6A is a sectioned illustration of a coupled waveguide gas laser of the prior art and a diagram of the intensity distribution of the optical field contained therein.

FIG. 6A illustrates a portion 74 of a coupled waveguide gas laser of the prior art comprising resonators 76 and 78 in ceramic body 80 separated by a dielectric medium 82 which is transparent to the laser radiation, and includes a diagram of the intensity distribution of the optical field therein. The diagram contains curve 84 of the optical intensity and axis 86 indicating intensity magnitude and axis 88 denoting position across the section. Those skilled in the art will note that of the two normal modes that are possible for weakly coupled resonators (symmetric and antisymmetric) only the symmetric mode is shown, as it is the only mode where laser intensities are in phase and at a maximum. Yet, the presence of the dielectric between resonators requires the optical field intensity to diminish to approximately zero therein which favors the selection of the antisymmetric normal mode. Moreover, the loss provided by the dielectric deprives the laser of optical power. In addition, it is difficult to obtain dielectrics with both good optical transmission and good heat conductivity.

Figure 6B:
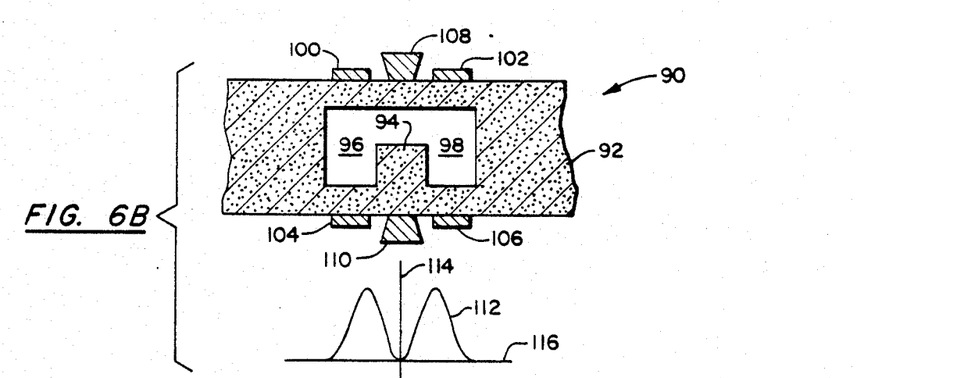
FIG. 6B is a sectioned illustration of a phase coupled ridge waveguide of the prior art and a diagram of the intensity distribution of the optical field contained therein.

FIG. 6B contains a sectioned illustration of a portion 90 of a phase locked ridge waveguide gas laser of the prior art and an intensity diagram of the optical field therein. The laser comprises ceramic body 92 with a ridge 94 fabricated therein forming resonators 96 and 98. Also included are a pair of upper RF electrodes 100, 102 and a pair of lower RF electrodes 104 and 106 as well as permanent magnets 108 and 110. The diagram has curve 112 of optical intensity. Axis 114 indicates the intensity magnitude and axis 116 denotes position across the section.

Removal of some of the dielectric from between the resonators eliminates a source of optical power loss. However, those skilled in the art will note that the lack of dielectric between the resonators would allow the lasing gas to break down in the gap region rather than the resonators. The permanent magnets prevent gas breakdown within the gap and confine the plasma to the resonators.

As in the case of a somewhat lossy dielectric, the optical field intensity in the region between resonators must also approach zero because of the requirement that the discharge be contained within the resonator housing.

Figure 6C:
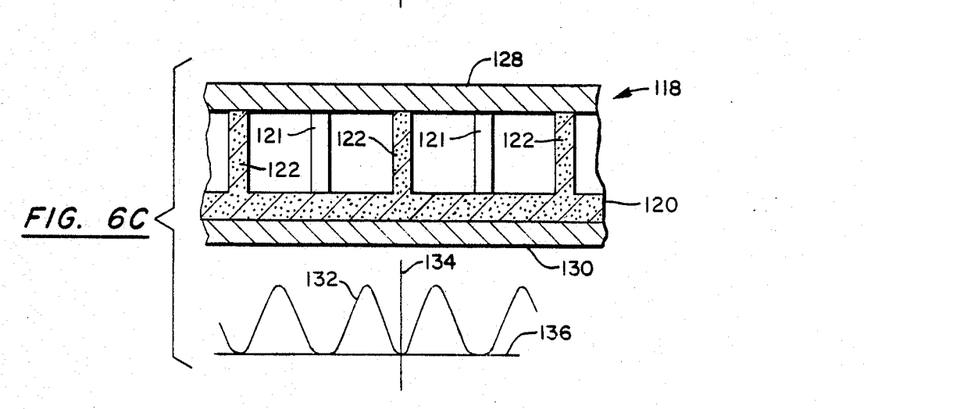
FIG. 6C is a sectioned illustration of a portion of a phase locked rectangular staggered ridge array waveguide gas laser provided according to the present invention and a diagram of the intensity distribution of the optical field contained therein.

FIG. 6C is a sectioned illustration of a portion 118 of phase locked staggered rectangular ridge array waveguide gas laser akin to that depicted in FIG. 1 of the drawing. It includes a body 120 having rectangular staggered ridges 121 and 122 fabricated therein forming resonators 123, 124 and 126. Also included are upper RF electrode 128, and lower RF electrode 130 and a diagram of the intensity of the optical field contained therein. The diagram, which illustrates the symmetric mode, contains curve 132 of the optical intensity, and axes 134 and 136 denote intensity magnitude and position across the laser section respectively.

Although only two of the ridges 121 and three of the ridges 122 are illustrated, those skilled in the art will recognize that the representations of the optical field for the double ridge/three resonator configuration can be extended to multiple ridge/resonator configurations. In the best mode embodiment the resonator physical parameters are selected to support only the antisymmetric mode of operation.

Examination of the intensity diagram of FIG. 6C reveals that the optical field intensity drops substantially to zero at the regions of the respective ridges 121 and 122. Thus, the ridges 121 and 122 absorb only minimum amounts, if any, of the energy of the $EH_{21}$ mode.

Figure 7:
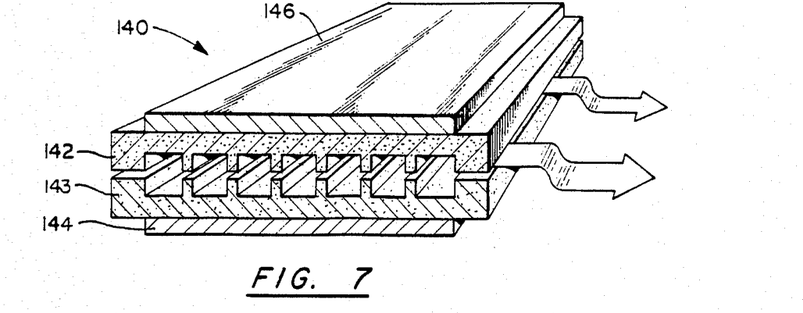
FIG. 7 is an illustration partially in section and partially in perspective of an alternative embodiment of a staggered ridge ridge waveguide gas laser of FIG. 1.

FIG. 7 is an illustration partially in perspective and partially in section of a portion of an alternative embodiment 140 of a phase locked staggered ridge array waveguide gas laser provided according to the present invention and similar to that of FIG. 2. Dielectric body 142 and 143 is fabricated such that a large volume of flowing lasing gas can be provided to the internal space in a continuous fashion. The body 142 and 143 is bounded by lower RF electrode 144 and an upper RF electrode 146. This configuration enhances the laser operational capabilities of the laser in very high continuous duty applications and also has the advantage of providing convective cooling by the flowing gas in addition to conductive cooling provided by the ceramic dielectric material forming the ridged waveguides. Moreover, discharge produced gas constituents which may be detrimental to the operation of the laser can be quickly removed. Housing, end covers, mirrors, and radio frequency excitation circuitry which comprise this alternative embodiment have not been illustrated and correspond to those elements described hereinbefore with respect to FIG. 1.

Figure 8:
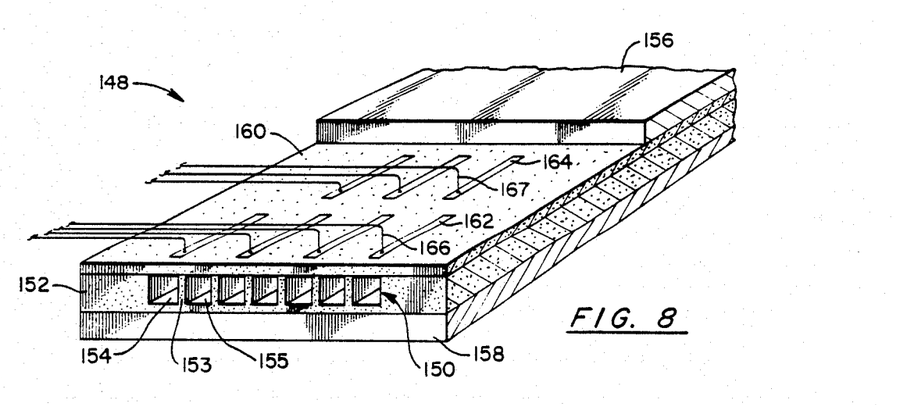
FIG. 8 is an illustration partially in section and partially in perspective of a phase controlled staggered ridge array waveguide gas laser provided according to the present invention.

FIG. 8 is an illustration partially in section and partially in perspective of a portion of a phase controlled staggered ridge array waveguide gas laser 148 provided according to the present invention. Internal space 150 is formed within a ceramic body consisting of a bottom component 152 and a top component 160 and has a plurality of staggered ridges which define a plurality of resonators therebetween, of which ridge 153 separating resonators 154 and 155 is an example. Upper RF electrode 156 which extends less than the resonator length provides radio frequency excitation in conjunction with lower electrode 158. Not shown in FIG. 6 are a metal housing and end covers which enclose the ceramic body 152 and RF electrodes 156 and 158 and are exactly analogous to corresponding metal housing and end covers described with respect to FIG. 1. Unless indicated herein, the materials and structures which comprise the laser described with respect to FIG. 6 are identical to corresponding materials and structures described with respect to FIG. 1.

In addition, for each of the plurality of resonators there exists discrete RF electrodes that are individually responsive to external signals provided thereto, of which electrodes 162 and 164 and corresponding lines 166 and 167 are examples. In the best mode embodiment the discrete RF electrodes comprise copper strips approximately 0.2 cm wide by 2 cm long and 20 in thickness deposited by conventional techniques on the ceramic cover 160. The additional radio frequency field provided by the supplemental electrodes causes a change in the plasma density of the gas contained in the resonators. Since the plasma density is related to the index of refraction, changing the local plasma density will produce a change in the effective optical path length of each of the resonators.

It is well known in the art that the phase and frequency of oscillation within the resonator is a function of the optical path length. Moreover, optically coupled resonators will phase lock only if all the resonators are within a narrow range of optical path lengths. Substantial variations in the optical path length of the resonators can be traced to several causes, especially environmental parameters such as thermal stresses for the phase controlled staggered ridge array waveguide provided according to the present invention. In the past, it was assured that the optical path length difference between resonators should be less than 10% of the lasing wavelength in order to phase lock the guided mode optical signals therefrom. However, when tests were performed with the laser arrangement constructed in accordance with the present invention, it was determined that there existed robust phase locking in the antisymmetric mode.

The discharge intensity modulation provided by the supplemental RF electrodes is responsive to external signals and allows for optical path length compensation to be externally introduced. The phase adjustment provided by the variable optical path of each resonator will ensure phase locked operation of the laser.

Figure 9:
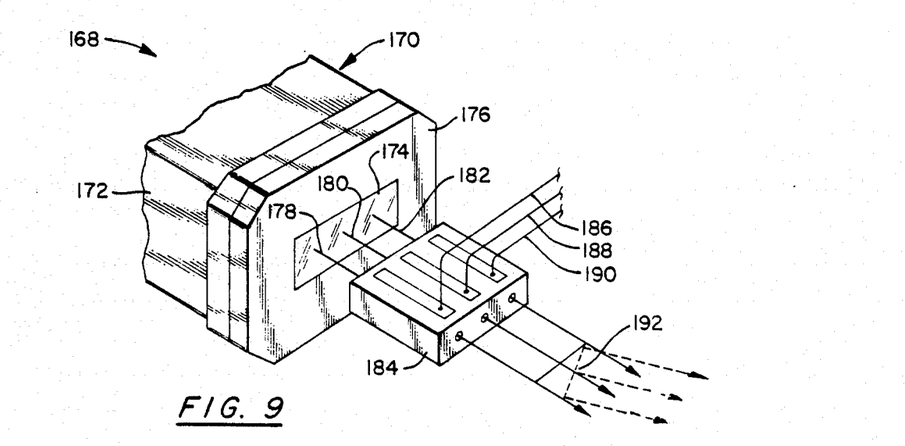
FIG. 9 is a perspective illustration of a staggered ridge array waveguide optical phased gas laser provided according to the present invention.

FIG. 9 is an illustration partially in section and partially in perspective of a laser arrangement embodying a staggered ridge array waveguide optical phased array gas laser arrangement 168 responsive to an external signal that is provided according to the present invention. The staggered ridge array waveguide optical phased array comprises a phase locked staggered ridge array waveguide gas laser 170 including metal housing 172 and mirror 174 mounted within end cover 176. Not illustrated in FIG. 9 is a complementary end port which encloses a ceramic body having longitudinal ridges and RF electrodes that are exactly analogous to corresponding components of a phase locked staggered ridge array waveguide gas laser described with respect to FIG. 1.

The output signals of the phase locked staggered ridge array waveguide gas laser comprise guided mode optical signals 178, 180 and 182, all having the same phase because of the 180° phase shift that has been introduced in the near field pattern in the manner alluded to before. These signals are input into an extracavity phase modulator 184 which comprises a parallel array of cadmium telluride or equivalent conventional phase modulators, each of which receive a guided mode optical signal.

The phase modulators are responsive to external signals provided on lines 186, 188 and 190 by a control signal processor not shown and not part of the present invention. Due to the identical phase of the input guided mode optical signals, a slight perturbation to the optical path length thereof by the phase modulators will result in a tilting or change in direction of the phase front of the phase modulator output signal 192.

Although the invention has been shown and described with respect to a best mode embodiment thereof, it should be understood by those skilled in the art that various other changes, omissions and additions thereto may be made therein, without departing from the spirit and scope of the invention.

We claim:

1. A phase-locked ridge waveguide gas laser, comprising:
   a body circumferentially bounding an internal space extending along a central plane and having length and width dimensions parallel to said central plane and a height dimension normal to said central plane;
   a gaseous lasing medium contained in said internal space;
   excitation means disposed on said body for exciting said gaseous medium at radio frequency with attendant light emisssion from said gaseous medium;
   light-reflecting means so positioned relative to said body as to provide lasing of said light emission; and
   partitioning means for partitioning said internal space into at least two arrays of laser resonator cavities,
   each of said cavities having such width as to sustain a guided mode of the lasing light emission, extending along said length dimension and being spaced from an adjacent cavity of the same cavity array in the direction of said width dimension,
   said partitioning means including at least two arrays of ridges projecting from said body into said internal space along said height dimension and respectively delimiting said cavities of one and the other of said cavity arrays, and
   said ridges of each of said ridge arrays being situated at an opposite longitudinal side of a transverse plane that is parallel to said height and width dimensions from those of the respective other ridge, array being offset relative to those of said other ridge array in the direction of said width dimension by substantially one-half of said cavity width, and having such a cross- sectional configuration that a cavity of one of said cavity arrays alignedly opens into only a portion of each of two adjacent ones of said cavities of the respective other cavity array.

2. The gas laser as defined in claim 1, wherein said cross-sectional configuration of each of said ridges is substantially rectangular.

3. The gas laser as defined in claim 1, wherein said body has two major walls that are parallel to said central plane and delimit said internal space; and wherein each of said ridges consists of two ridge portions each projecting from one of said major walls of said body toward said central plane.

4. The gas laser as defined in claim 3, wherein each of said ridge portions extends at least substantially all the way to said central plane.

5. The gas laser as defined in claim 3, wherein said cross-sectional configuration of each of said ridge portions is substantially cusp-shaped.

6. The gas laser as defined in claim 5, wherein each of said ridge portions is delimited by two concave surfaces.

7. The gas laser as defined in claim 5, wherein said concave surfaces delimiting at least one of said ridge portions of each ridge form a sharp edge at the central plane.

8. The gas laser as defined in claim 7, and further comprising auxiliary ridge portions projecting from at least one of said major walls each substantially midway between and coextensively with two adjacent ones of said ridge portions of at least one of said ridge arrays to separate two portions of the respective cavity from one another, each of said auxiliary ridge portions constituting an aligned continuation of a corresponding ridge portion of the other of said ridge arrays and terminating a predetermined distance short of said central plane to delimit a gap through which said portions of the respective cavity are in communication with one another at least at said central plane.

9. The gas laser as defined in claim 8, and further comprising additional auxiliary ridge portions similar to said auxiliary ridge portions and projecting from the other of said major walls in alignment with said auxiliary ridge portions.

10. The gas laser as defined in claim 8, wherein said auxiliary and additional auxiliary ridge portions collectively constitute an array of auxiliary ridge portions interleaved with said ridge portions of one of said arrays; and further comprising another array of auxiliary ridge portions similar to said array of auxiliary ridge portions and interleaved with said ridge portions of the other of said arrays.

11. The gas laser as defined in claim 8, wherein said cross-sectional configuration of each of said ridge portions is substantially cusp-shaped; and wherein each of said auxiliary ridge portion has a cross-sectional configuration of a truncated cusp.

12. The gas laser as defined in claim 11, wherein each of said ridge portions is delimited by two concave surfaces.

13. The gas laser as defined in claim 12, wherein said concave surfaces delimiting at least one of said ridge portions of each ridge form a sharp edge at the central plane.

14. The gas laser as defined in claim 13, wherein each of said auxiliary ridge portions is delimited by two concave auxiliary surfaces and a substantially flat auxiliary surface extending between said concave auxiliary surfaces substantially parallel to and at a spacing from said central plane.

15. The gas laser as defined in claim 1, wherein said body has two major walls that are parallel to said central plane and delimit said internal space;
   wherein each of said ridge arrays include two sets of said ridges, said ridges of each of said sets projecting from a different one of said major walls of said body toward said central plane, and said ridges of one of said sets of each of said ridge arrays being situated substantially midway between said ridges of the other of said sets of the same ridge array; and further comprising auxiliary ridges each coextensive with two adjacent ones of said ridges of one of said sets and aligned in the direction of said height dimension with an associated one of said ridges of the other of said sets of the respective ridge array and consituting an aligned continuation of a corresponding ridge of the other of said ridge arrays, each of said auxiliary ridges terminating a predetermined distance short of said central plane to delimit a gap through which portions of the respective cavity that are separated from one another by the respective auxiliary ridge are in communication with one another at said central plane.

16. The gas laser as defined in claim 15, wherein said cross-sectional configuration of each of said ridges is substantially cusp shaped; and wherein each of said auxiliary ridges has a cross-sectional configuration of a truncated cusp.

* * * * *